(12) United States Patent
Shimakawa

(10) Patent No.: US 11,895,288 B2
(45) Date of Patent: Feb. 6, 2024

(54) INFORMATION PROCESSING DEVICE, PROPOSAL DEVICE, INFORMATION PROCESSING METHOD, AND PROPOSAL METHOD

(71) Applicant: SONY GROUP CORPORATION, Tokyo (JP)

(72) Inventor: Masato Shimakawa, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 126 days.

(21) Appl. No.: 17/761,035

(22) PCT Filed: Oct. 12, 2020

(86) PCT No.: PCT/JP2020/038522
§ 371 (c)(1),
(2) Date: Mar. 16, 2022

(87) PCT Pub. No.: WO2021/085105
PCT Pub. Date: May 6, 2021

(65) Prior Publication Data
US 2022/0337803 A1    Oct. 20, 2022

(30) Foreign Application Priority Data
Oct. 28, 2019   (JP) ................................. 2019-195579

(51) Int. Cl.
*H04N 13/282* (2018.01)
*G06V 20/40* (2022.01)
(Continued)

(52) U.S. Cl.
CPC ....... *H04N 13/282* (2018.05); *G06V 10/7553* (2022.01); *G06V 10/761* (2022.01);
(Continued)

(58) Field of Classification Search
USPC .......................................................... 348/42
See application file for complete search history.

(56) References Cited

U.S. PATENT DOCUMENTS

2007/0276956 A1* 11/2007 Dorai ...................... H04L 67/55
709/231
2008/0111666 A1*  5/2008 Plante .................... G07C 5/008
340/425.5
(Continued)

FOREIGN PATENT DOCUMENTS

JP    H11-266428 A    9/1999
JP    2000-285242 A   10/2000
(Continued)

OTHER PUBLICATIONS

Ofli et al., Learn2Dance: Learning Statistical Music-to-Dance Mappings for Choreography Synthesis, IEEE Transactions on Multimedia, Jun. 2012, pp. 747-759, vol. 14, No. 3, IEEE.

*Primary Examiner* — Nigar Chowdhury
(74) *Attorney, Agent, or Firm* — Paratus Law Group, PLLC

(57) ABSTRACT

An information processing device (10) includes a decision unit (23e) and a generation unit (23f). The decision unit (23e) decides connection order of divided scenes obtained by dividing a free-viewpoint video based on a multi-viewpoint video obtained by imaging content, based on a feature amount of a given sound and similarities between respective connection frames in the divided scenes. The generation unit (23f) generates free-viewpoint content in which the divided scenes are connected in the connection order decided by the decision unit (23e).

15 Claims, 13 Drawing Sheets

(51) Int. Cl.
  *G06V 10/74* (2022.01)
  *G06V 10/75* (2022.01)
  *G10H 1/00* (2006.01)
  *G11B 27/10* (2006.01)
  *H04N 21/439* (2011.01)

(52) U.S. Cl.
  CPC .............. *G06V 20/48* (2022.01); *G06V 20/49* (2022.01); *G10H 1/0008* (2013.01); *G11B 27/10* (2013.01); *G10H 2210/021* (2013.01); *G10H 2210/061* (2013.01)

(56)  References Cited

U.S. PATENT DOCUMENTS

2009/0284601 A1* 11/2009 Eledath .................. G06T 7/215
   375/E7.076
2010/0306193 A1* 12/2010 Pereira ................ G06F 16/7328
   707/E17.014
2012/0276513 A1* 11/2012 Ayers ..................... G09B 19/00
   434/310

FOREIGN PATENT DOCUMENTS

| JP | 2004-159331 A | 6/2004 |
| JP | 2005-056101 A | 3/2005 |
| JP | 2010-267069 A | 11/2010 |
| WO | 2008-005167 A | 1/2008 |
| WO | 2010-044484 A | 2/2010 |

* cited by examiner

| PER-FORMER ID | SCENE ID | MUSIC FEATURE AMOUNT | TIME LENGTH (SECOND) | THREE-DIMENTIONAL MODEL | ... |
|---|---|---|---|---|---|
| A001 | B001 | C001 | 5.5 | D001 | ... |
| | B002 | C002 | 8.9 | D002 | ... |
| | B003 | C003 | 10.6 | D003 | ... |
| | ... | ... | ... | ... | ... |
| ... | ... | ... | ... | ... | ... |

INFORMATION PROCESSING DEVICE, PROPOSAL DEVICE, INFORMATION PROCESSING METHOD, AND PROPOSAL METHOD

CROSS REFERENCE TO PRIOR APPLICATION

This application is a National Stage Patent Application of PCT International Patent Application No. PCT/JP2020/038522 (filed on Oct. 12, 2020) under 35 U.S.C. § 371, which claims priority to Japanese Patent Application No. 2019-195579 (filed on Oct. 28, 2019), which are all hereby incorporated by reference in their entirety.

FIELD

The present disclosure relates to an information processing device, a proposal device, an information processing method, and a proposal method.

BACKGROUND

For example, there is a technique of modeling correspondence relation between a piece of information about dance movements collected in advance and music, and generating a dance image conforming to given music. According to such a technique, a CG image conforming to music can be automatically generated (see, for example, Non Patent Literature 1).

CITATION LIST

Non Patent Literature

Non Patent Literature 1: F. Ofli, E. Erzin, Y. Yemez and A. M. Tekalp: IEEE Transactions on Multimedia Vol. 14, No. 3 (2012)

SUMMARY

Technical Problem

However, in the conventional art, since it is premised on generating a CG image, it has not been considered to generate new free-viewpoint content by connecting live-action free-viewpoint videos. When generating new free-viewpoint content from live-action free-viewpoint videos, smoothly connecting movements of an object in the free-viewpoint videos is a major challenge.

The present application is provided in view of the above, and an object thereof is to provide an information processing device, a proposal device, an information processing method, and a proposal method capable of generating free-viewpoint content in which movements of an object are smoothly connected.

Solution to Problem

An information processing device includes a decision unit and a generation unit. The decision unit decides connection order of divided scenes obtained by dividing a free-viewpoint video based on a multi-viewpoint video obtained by imaging content, based on a feature amount of a given sound and similarities between respective connection frames in the divided scenes. The generation unit generates free-viewpoint content in which the divided scenes are connected in the connection order decided by the decision unit.

According to one aspect of embodiments, live-action free-viewpoint content in which movements of an object are smoothly connected can be generated.

DESCRIPTION OF EMBODIMENTS

Embodiments of the present disclosure will be hereinafter described in detail based on the drawings. Note that, in each of the following embodiments, the same parts are denoted by the same reference signs so that duplicate description is omitted.

First Embodiment

Figure 1:
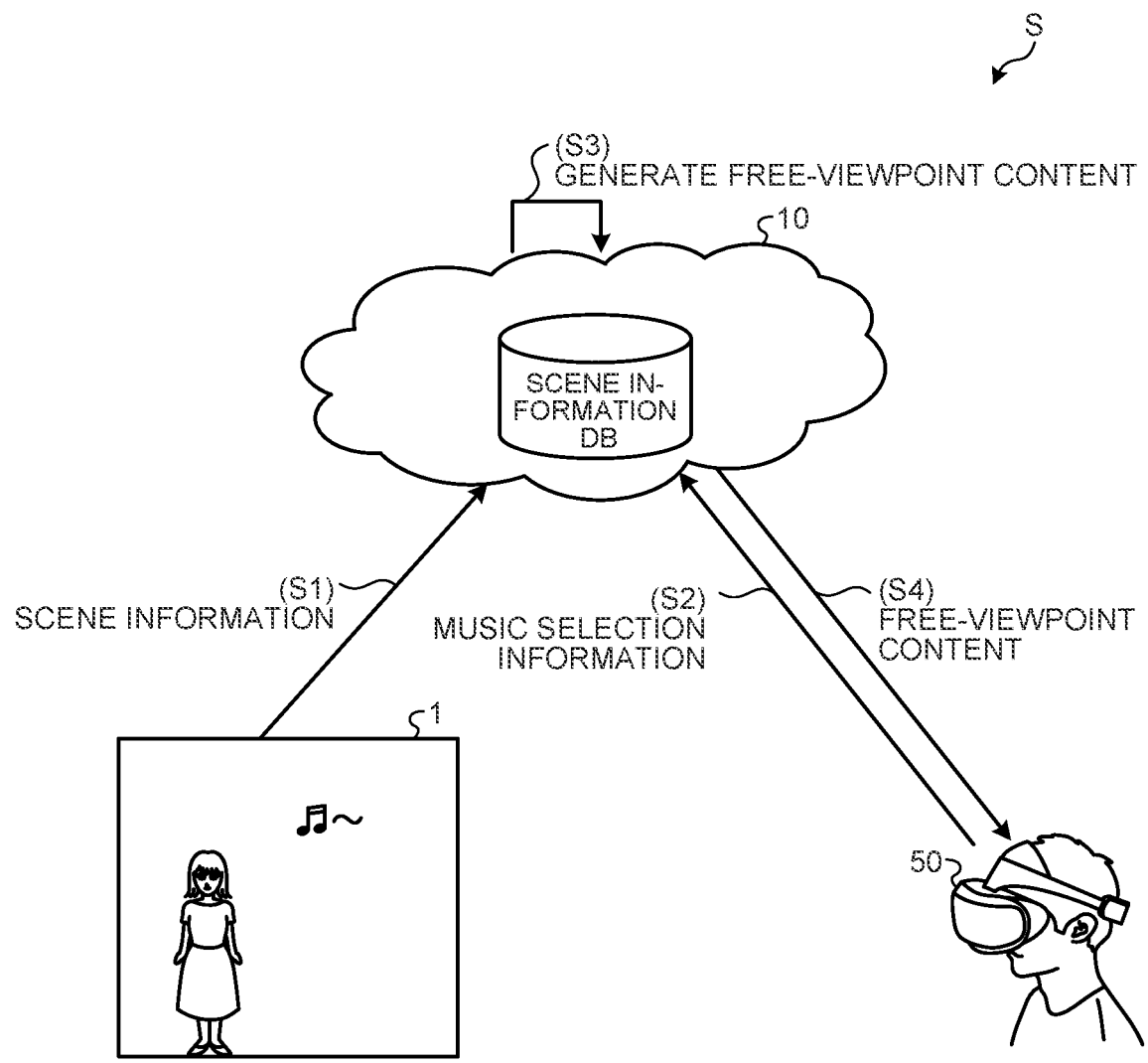
FIG. 1 is a diagram illustrating an outline of a providing system according to an embodiment.

First, an outline of a providing system according to an embodiment will be described with reference to FIG. 1. FIG. 1 is a diagram illustrating an example of the providing system according to the embodiment. Note that, a case where an object is a performer and a sound is music will be hereinafter described as an example.

The providing system S according to the embodiment is, for example, a system that provides free-viewpoint content of a dance image by a performer. Specifically, in the providing system S according to the present embodiment, for example, free-viewpoint content of a dance image conforming to music specified by a user is generated from a free-viewpoint video based on a multi-viewpoint video obtained by imaging a performer. Note that, the performer is, for example, a dancer, an idol, an entertainer, and the like, but may include an ordinary person (user).

The free-viewpoint video in this description is a video obtained by 3D modeling an image of a performer in the real world, and is a dance image in which the performer dances to recorded music. That is, the providing system S according to the embodiment generates, from a dance image in which a performer dances to recorded music, a live-action volumetric video conforming to given music.

Specifically, in the providing system S, free-viewpoint content formed from a free-viewpoint video is generated by dividing the above-described free-viewpoint video and rearranging, conforming to given music, the divided scenes obtained by the division by changing the connection order.

As a result, in the providing system S according to the embodiment, for example, free-viewpoint content that faithfully reflects actual movements of a performer that cannot be reproduced on a CG basis can be generated.

As illustrated in FIG. 1, the providing system S according to the embodiment includes a scene information generation device 1, an information processing device 10, and a user terminal 50. The scene information generation device 1 is installed in, for example, a studio and the like, and generates a free-viewpoint video based on a multi-viewpoint video of a performer. Furthermore, the scene information generation device 1 divides the generated free-viewpoint video to generate divided scenes.

In the present embodiment, the scene information generation device 1 generates a free-viewpoint video of a dance image in which a performer dances to recorded music and divided scenes based on the free-viewpoint video. The scene information generation device 1 then generates scene information about the divided scenes and transmits it to the information processing device 10 (step S1).

The information processing device 10 includes scene information DB in which the scene information transmitted from the scene information generation device 1 is stored, and generates the above-described free-viewpoint content. Specifically, for example, when the information processing device 10 acquires music selection information from the user terminal 50 (step S2), the information processing device 10 refers to the scene information DB and generates free-viewpoint content conforming to music specified by the music selection information (step S3).

The information processing device 10 then provides the generated free-viewpoint content to the user terminal 50 (step S4). In the example illustrated in FIG. 1, the user terminal 50 is a head mounted display compatible with augment reality (AR) or virtual reality (VR). The user terminal 50 reproduces the free-viewpoint content provided by the information processing device 10 according to viewpoint information of a user.

The providing system S according to the embodiment will be hereinafter described in further detail.

Figure 2:
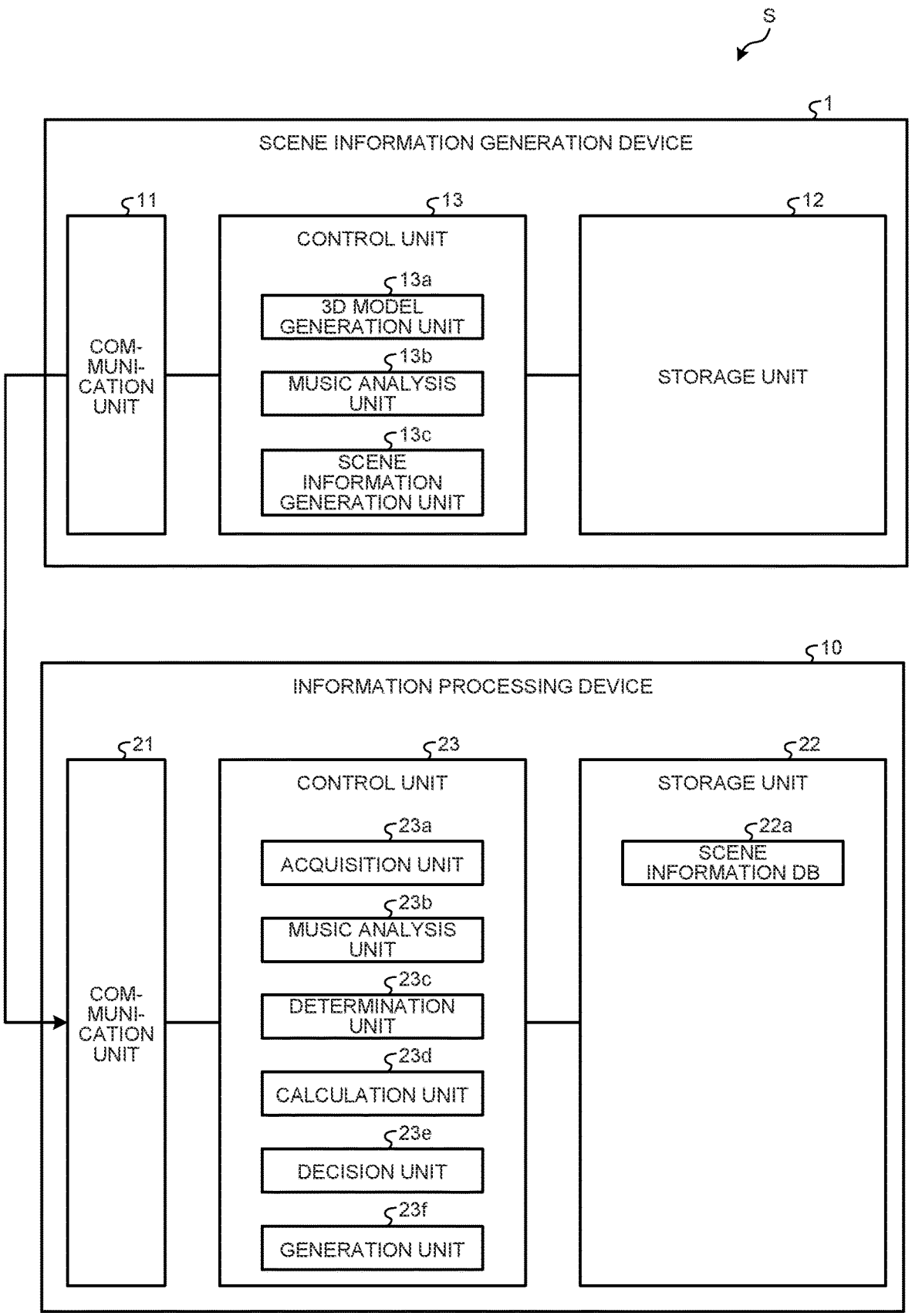
FIG. 2 is a block diagram illustrating a configuration example of the providing system according to the embodiment.

A configuration example of the providing system S according to the embodiment will now be described with reference to FIG. 2. FIG. 2 is a block diagram illustrating a configuration example of the providing system S according to the embodiment. First, the scene information generation device 1 will be described.

As illustrated in FIG. 2, the scene information generation device 1 includes a communication unit 11, a storage unit 12, and a control unit 13. The communication unit 11 is a communication module used for communication with the information processing device 10 via a predetermined network.

The storage unit 12 includes, for example, by a semiconductor memory element such as a RAM and a flash memory, or a storage device such as a hard disk and an optical disk. The storage unit 12 stores information required for various types of processing in the control unit 13.

The control unit 13 is implemented, for example, when a central processing unit (CPU), a micro processing unit (MPU), and the like execute, on a working area such as a random access memory (RAM), a program stored in the scene information generation device 1. The control unit 13 is a controller, and may be implemented, for example, by an integrated circuit such as an application specific integrated circuit (ASIC) and a field programmable gate array (FPGA).

As illustrated in FIG. 2, the control unit 13 includes a 3D model generation unit 13a, a music analysis unit 13b, and a scene information generation unit 13c, and implements or performs functions and actions of information processing to be described below. Note that, the internal configuration of the control unit 13 is not limited to the configuration illustrated in FIG. 2, and may be a different configuration as long as it enables the information processing to be described below. Note that, the control unit 13 may be connected to a predetermined network by wire or wirelessly using, for example, a network interface card (NIC) or the like, and receive various types of information from an external server and the like via the network.

The 3D model generation unit 13a generates a three-dimensional model of a performer for each frame of a multi-viewpoint video based on camera videos input from a plurality of cameras (not illustrated), that is, the multi-viewpoint video of the performer. That is, the 3D model generation unit 13a generates a live-action free-viewpoint video based on a multi-viewpoint video.

For example, the 3D model generation unit 13a can generate three-dimensional models from a dance image of a performer by using a multi-view method of generating three-dimensional models from all camera videos at once, a stereo-view method of sequentially integrating three-dimensional models from pairs of two cameras, and the like.

The music analysis unit 13b analyzes recorded music in a dance image of a performer. The music analysis unit 13b detects a rest section of the recorded music, divides the recorded music into parts based on the rest section, and analyzes a feature amount of each part.

The feature amount in this description is a concept including a tempo, tune, and the like. Examples of the tune include fun tunes, dark tunes, energetic tunes, quiet tunes, and the like. For example, the music analysis unit 13b can acquire a feature amount of recorded music by inputting music data of the recorded music to a model generated by machine learning.

The scene information generation unit 13c generates divided data obtained by dividing, based on the recorded music analyzed by the music analysis unit 13b, three-dimensional models generated by the 3D model generation unit 13a, that is, a free-viewpoint video.

As described above, free-viewpoint content is content obtained by rearranging divided scenes. Therefore, in free-viewpoint content, it is preferable to smoothly connect the movements of a performer between divided scenes. In other words, it is preferable to make a division between divided scenes less noticeable to a user.

Therefore, the scene information generation unit 13c divides a free-viewpoint video at a section where the movement of a performer stops in the free-viewpoint video. In general, there are many scenes in which a performer stops moving in a rest section while dancing, for example, a performer poses.

Figure 3:
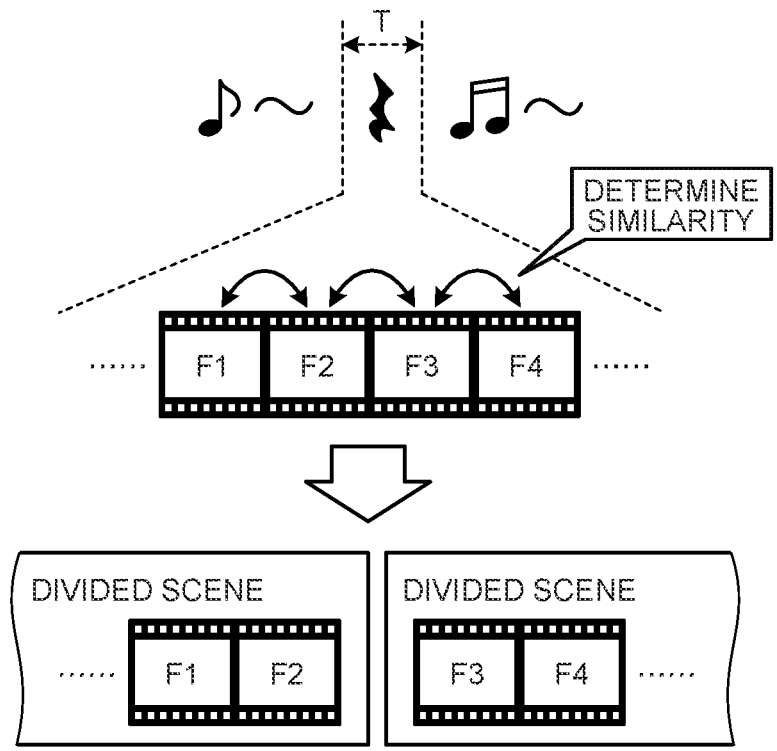
FIG. 3 is a diagram illustrating an example of generating divided scenes according to the embodiment.

Therefore, the scene information generation unit 13c divides a free-viewpoint video focusing on a rest section of recorded music. An example of divided scenes will now be described with reference to FIG. 3. FIG. 3 is a diagram illustrating an example of generating divided scenes according to the embodiment. As illustrated in FIG. 3, the scene information generation unit 13c firstly extracts frames of a free-viewpoint video in a rest section T of recorded music.

In the example illustrated in FIG. 3, a case where a free-viewpoint video includes frames F1 to F4 in the rest section T is illustrated. The scene information generation unit 13c then determines similarities between each frame F1 to F4 and the neighboring frames.

That is, with respect to the frame F2, a similarity between the frame F2 and the frame F1 that is before the frame F2 and a similarity between the frame F2 and the frame F3 that is after the frame F2 are determined. Note that, a similarity is determined by comparing three-dimensional models of frames.

The scene information generation unit 13c divides a free-viewpoint video between frames having the highest similarity to generate divided scenes. In other words, the scene information generation unit 13c divides a free-viewpoint video at a section where a performer is stationary.

In the example illustrated in FIG. 3, a case where the similarity between the frame F2 and the frame F3 is the highest is illustrated, and a case where the free-viewpoint video is divided between the frame F2 and the frame F3 is illustrated. When the divided scenes are generated, the scene information generation unit 13c generates scene information in which a feature amount and the like of recorded music are provided to each divided scene. The scene information generated by the scene information generation unit 13c is transmitted to the information processing device 10 via the communication unit 11 illustrated in FIG. 2.

At this time, the scene information generation unit 13c may generate, from the same divided scene, divided scenes having different time lengths. As a result, variations in time of one divided scene can be expanded.

Figure 4:
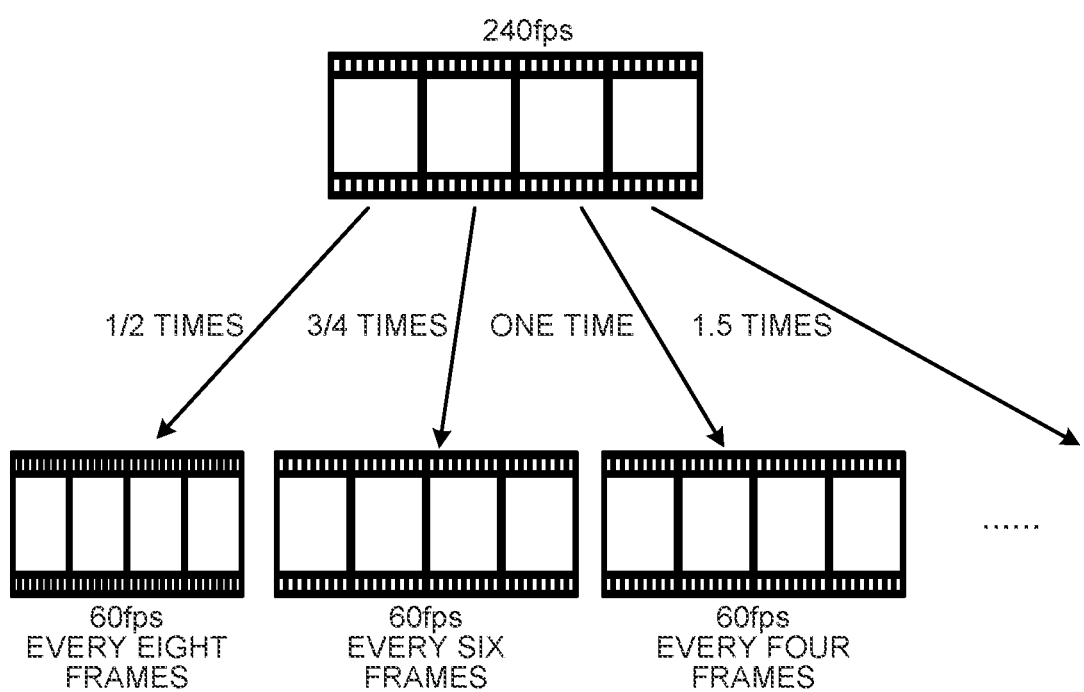
FIG. 4 is a diagram illustrating an example of variations of a divided scene.

The variations in time of a divided scene will now be described with reference to FIG. 4. FIG. 4 is a diagram illustrating an example of variations of a divided scene. Note that, in this example, a case where divided scenes of 60 frames per second (fps) are generated from a divided scene of 240 fps will be described.

The scene information generation unit 13c generates a plurality of divided scenes having different time lengths by thinning out the frames in a divided scene of 240 fps. Specifically, the scene information generation unit 13c performs thinning out processing on the divided scene such that the time lengths are ½ times, ¾ times, 1 time, 1.5 times, . . . with respect to the original divided scene.

For example, when the scene information generation unit 13c generates a divided scene having a time length ½ times as long, the scene information generation unit 13c generates a new divided scene by extracting one frame for every eight frames of the original divided scene and connecting the extracted frames. Similarly, when the scene information generation unit 13c generates a divided scene having a time length ¾ times as long, the scene information generation unit 13c extracts one frame for every six frames of the original divided scene and connects the extracted frames.

In this manner, the scene information generation unit 13c generates divided scenes having different time lengths by changing the interval of the frames to be extracted according to the multiplying factor of the time length. Accordingly, the variations in time for one divided scene can be expanded. Therefore, the variations of free-viewpoint content can be expanded even if the number of free-viewpoint videos is small.

Furthermore, the scene information generation unit 13c may generate a divided scene for connection (hereinafter referred to as a connection scene) and perform the above-described processing on the connection scene. A connection scene in this description is, for example, a divided scene preferentially assigned to a rest section of given music. That is, a connection scene can be described as a divided scene used for smoothly connecting the movements of a performer between divided scenes in free-viewpoint content.

As described above, the scene information generation unit 13c divides a free-viewpoint video at a rest section T of recorded music, and as described below, the information processing device 10 connects divided scenes in a rest section of given music.

Therefore, the connection of divided scenes can be facilitated by expanding the variations of a start pose and an end pose of a performer and the variations of a time length in connection scenes.

Referring back to FIG. 2, the information processing device 10 will be described. As illustrated in FIG. 2, the information processing device 10 includes a communication unit 21, a storage unit 22, and a control unit 23. The communication unit 21 is a communication module used for communication with the scene information generation device 1 or the user terminal 50.

The storage unit 22 includes, for example, a semiconductor memory element such as a RAM and a flash memory, or a storage device such as a hard disk or an optical disk. In the example illustrated in FIG. 2, the storage unit 22 includes scene information DB 22a.

Figures 5, 6:
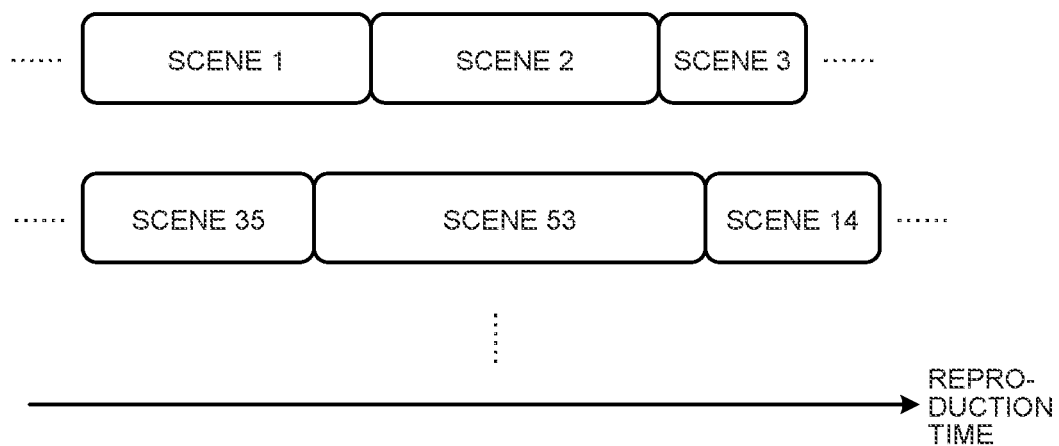
FIG. 5 is a diagram illustrating an example of scene information DB according to the embodiment.
FIG. 6 is a schematic diagram of candidate paths according to the embodiment.

The scene information DB22a will now be described with reference to FIG. 5. FIG. 5 is a diagram illustrating an example of the scene information DB 22a according to the embodiment. As illustrated in FIG. 5, the scene information DB 22a is a database in which "performer IDs", "scene IDs", "music feature amounts", "time lengths", "three-dimensional models", and the like are stored in association with each other.

The "performer ID" indicates an identifier used for identifying a performer in a free-viewpoint video. The "scene ID" is an identifier used for identifying each of the above-described divided scenes. The "music feature amount" indicates a feature amount of recorded music in the corresponding divided scene.

The "time length" is the time length of the corresponding divided scene, and the "three-dimensional model" is a free-viewpoint video body of the corresponding divided scene. Note that, in addition to a free-viewpoint video, a three-dimensional model includes a bone model indicating the joint positions of a performer and point cloud data indicating the surface shape of the performer. The scene information DB 22a illustrated in FIG. 5 is one example, and other information may be stored together. Specifically, the scene information DB 22a may also store the ease of connection with each divided scene (corresponding to a connection cost to be described below) and the like.

Returning to the description of FIG. 2, the control unit 23 will be described. The control unit 23 rearranges the above-described divided scenes according to feature amounts of given music to generate free-viewpoint content.

The control unit 23 is implemented, for example, when a central processing unit (CPU), a micro processing unit (MPU), and the like execute, on a working area such as a random access memory (RAM), a program stored in the scene information generation device 1. The control unit 3 is a controller, and may be implemented, for example, by an integrated circuit such as an application specific integrated circuit (ASIC) and a field programmable gate array (FPGA).

As illustrated in FIG. 2, the control unit 23 includes an acquisition unit 23a, a music analysis unit 23b, a determination unit 23c, a calculation unit 23d, a decision unit 23e, and a generation unit 23f, and implements or performs functions and actions of information processing to be described below. Note that, the internal configuration of the control unit 23 is not limited to the configuration illustrated in FIG. 2, and may be a different configuration as long as it enables the information processing to be described below. Note that, the control unit 23 may be connected to a predetermined network by wire or wirelessly using, for example, a network interface card (NIC) or the like, and receive various types of information from an external server and the like via the network.

The acquisition unit 23a acquires music selection information, for example, from the user terminal 50. The music selection information includes information about performer IDs and the like in addition to information about music. Note that, the music selection information may include information about mood of dance.

That is, a user can specify a preferable performer as a dancer and preferable music, and can also specify mood (atmosphere) of dance. The music selection information may be music data in which music is recorded, or may be information specifying music (singer, music title, and the like).

When the acquisition unit 23a acquires the information specifying music, the acquisition unit 23a may acquire music data from an external server based on the information. The music selection information may include information about a musical score. Moreover, the music selection information acquired by the acquisition unit 23a may include information specifying a divided scene to be added to free-viewpoint content. Furthermore, the acquisition unit 23a may acquire, as the music selection information, music data created by a user.

The music analysis unit 23b analyzes given music (for example, music specified by the music selection information). For example, the music analysis unit 23b performs, on the music specified by the music selection information, the processing that has been performed on the recorded music by the music analysis unit 13b.

Specifically, the music analysis unit 23b detects a rest section from music, divides the music into parts based on the rest section, and provides tune to each part.

The determination unit 23c determines similarities between the respective connection frames in divided scenes when the decision unit 23e to be described below performs decision processing of deciding the connection order of the divided scenes. Specifically, the determination unit 23c calculates a similarity between connection frames by comparing the three-dimensional models of a performer in the connection frames. Note that, the connection frames are, for example, a start frame and an end frame of each divided scene.

For example, the determination unit 23c determines a similarity between connection frames based on bone models indicating the joint positions of a performer in the connection frames and point cloud data indicating the surface shape of a performer in the connection frames. The similarity in this description is an index used for smoothly connecting the movements of a performer.

More specifically, the determination unit 23c can determine a similarity between connection frames by calculating the distance between the corresponding joints in bone models and the Hausrudorff distance between sets of vertex coordinates of the corresponding point cloud data in point cloud data.

The determination unit 23c then decides a connection score between the connection frames according to the determined similarity. Note that, in the following, the upper limit of the connection score is 10 points and the lower limit is 0 points, and the higher the similarity between the connection frames is, in other words, the more similar the poses of a performer in the connection frames are, the higher the connection score is.

Furthermore, when the connection order of the divided scenes is decided by the decision unit 23e, the determination unit 23c determines similarities of the neighboring frames of the connection frame. Note that, this point will be described below with reference to FIG. 9.

The calculation unit 23d calculates, based on the feature amount of the given music and the feature amount of the recorded music in the divided scene, a music score indicating conformity between each of parts obtained by dividing the music and each divided scene. For example, the calculation unit 23d calculates a music score based on a similarity between the tune of each of parts obtained by dividing the music and the tune of each divided scene.

The music score is calculated higher as both types of tune are similar to each other, and is calculated lower as both types of tune deviates from each other. For example, the calculation unit 23d calculates a music score according to tune by inputting both types of tune to a function indicating the relationship between both types of tune and a music score.

At this time, when music selection information includes information specifying mood (atmosphere) of the dance, the calculation unit 23d may calculate a music score based on the mood.

That is, for example, when the tune in a part is up-tempo but the mood of a specified dance is slow-tempo, for the part, a music score of the divided scene having slow-tempo tune may be calculated higher than a music score of the divided scene having up-tempo tune.

Furthermore, the calculation unit 23d may calculate a music score based on the time length of each part of the music and the time length of the divided scene. In this case, the music score is calculated higher as the time length of the part and the time length of the divided scene are closer.

At this time, the calculation unit 23d may calculate the final music score by weighting the music score calculated based on the tune and the music score calculated based on the time length.

The decision unit 23e decides the connection order of the divided scenes based on the feature amount of the given music and similarities between the respective connection frames in the divided scenes stored in the storage unit 22.

For example, the decision unit 23e decides the connection order of the divided scenes conforming to the given music based on the above-described connection score and the music score by using the so-called Viterbi algorithm. Note that, the connection order decided by using the Viterbi algorithm may be referred to as a Viterbi path.

Specifically, the decision unit 23e decides the connection order based on the accumulative score of the connection scores according to similarities between the divided scenes that are connected from the start to the end of the music.

First, the decision unit 23e generates candidate paths in which the divided scenes are connected from the start to the end of the music. FIG. 6 is a schematic diagram of the candidate paths. As illustrated in FIG. 6, each candidate path is formed from a plurality of the divided scenes.

For example, each connection pattern of the divided scenes that can be taken by the end of the reproduction time of the music can be a candidate path. First, when generating candidate paths, the decision unit 23e assigns each divided pattern to the start time (reproduction time t=0) of the music of a corresponding candidate path. At this time, the number of candidate paths that are generated corresponds to the number of the divided scenes.

The decision unit 23e then generates each candidate path by adding each divided pattern to the generated candidate paths and repeating the above-described processing until the music ends. Each candidate path generated in this manner repeatedly branches as the reproduction time proceeds.

The decision unit 23e notifies the determination unit 23c and the calculation unit 23d of information about the candidate paths every time a divided pattern is added to the candidate paths. As a result, connection scores between the connection frames in each candidate path are provided by the determination unit 23c, and music scores based on the music and the recorded music in each candidate path are provided by the calculation unit 23d.

Figure 7:
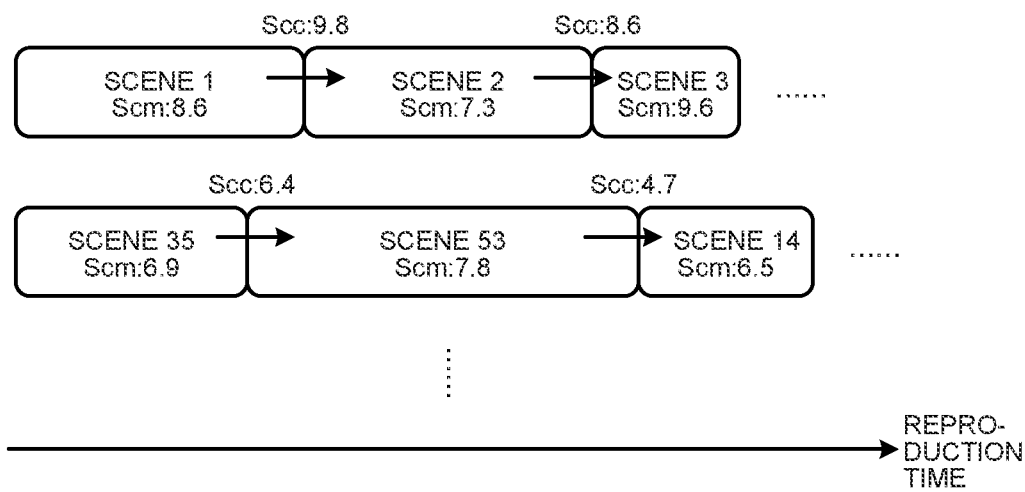
FIG. 7 is a diagram illustrating correspondence relation between connection scores and music scores.

FIG. 7 is a diagram illustrating correspondence relation between the connection scores and the music scores. Note that, in the example illustrated in FIG. 7, the connection scores are represented as "Scc" and the music scores are represented as "Scm". The connection scores Scc are values calculated according to similarities between the divided scenes every time the divided scenes are connected in the candidate path, and the music scores Scm are values calculated with respect to the divided scenes themselves.

The decision unit 23e calculates, for each candidate path, the accumulative cost that is an accumulative value of the connection scores Scc and the music scores Scm, and selects a candidate path making the accumulative score maximum. The decision unit 23e sets the divided scene at the end of the selected candidate path as a target scene, and adds a divided scene making the accumulative score maximum out of the divided scenes connected before the target scene.

Upon addition of the divided scene to the target scene, the decision unit 23e adds the added divided scene to the target scenes, and repeats the above-described processing, so as to decide a target path. That is, the decision unit 23e optimizes the connection order one more time from the end to the start of the music. The decision unit 23e decides, as the connection order, arrangement order in which the divided scenes are taken out from the target path in the reverse order (order from the start to the end of the music).

The thus obtained connection order is connection order that makes divided scenes that smoothly connect the movements of a performer continuous in time, and makes divided scenes assigned to tune of a part of the music that the divided scenes match.

Figure 8:
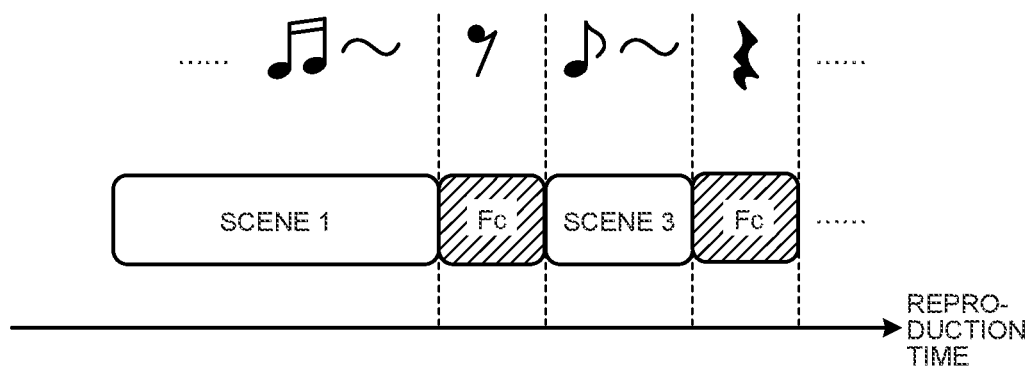
FIG. 8 is a schematic diagram illustrating correspondence relation between rest sections and connection scenes.

Furthermore, the decision unit 23e may, for example, preferentially assign the above-described connection scenes to the rest sections of the given music. FIG. 8 is a schematic diagram illustrating correspondence relation between the rest sections and the connection scenes.

As illustrated in FIG. 8, the decision unit 23e preferentially assigns the connection scenes Fc to the rest sections. As a result, the movements of a performer in the divided scenes can be smoothly connected in the connection scenes.

At this time, the decision unit 23e may adjust the time lengths of the connection scenes Fc according to the time lengths of the rest sections. Note that, the method described with reference to FIG. 4 can be applied to the adjustment of the time lengths of the connection scenes Fc.

At this time, when the connection scenes Fc are assigned to the rest sections, the calculation unit 23d may calculate music scores for the connection scenes Fc higher in comparison with a case where divided scenes other than the connection scenes Fc are assigned to the rest sections.

That is, for the rest sections, the weights of the music scores may be changed between the connection scenes Fc and divided scenes other than the connection scenes Fc. In other words, the calculation unit 23d may calculate the music scores such that the connection order in which the connection scenes Fc are preferentially assigned to the rest sections is decided. As a result, the discrepancy between given music and a dance of a performer in free-viewpoint content can be reduced.

Thereafter, upon deciding the connection order, the decision unit 23e notifies the determination unit 23c and the generation unit 23f of information about the connection order. As a result, the determination unit 23c determines similarities between the neighboring frames of the connection frames in addition to a similarity between the above-described connection frames.

Figure 9:
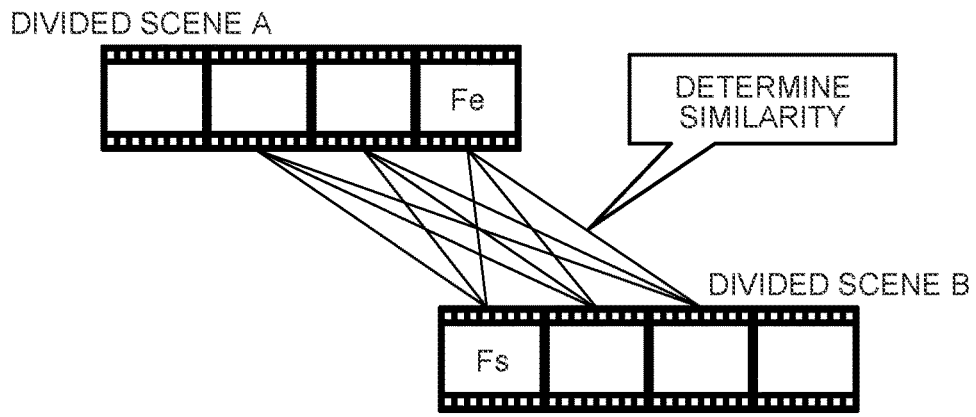
FIG. 9 is a diagram illustrating an example of neighboring frames.

A specific example of neighboring frames will now be described with reference to FIG. 9. FIG. 9 is a diagram illustrating an example of the neighboring frames. Note that, in FIG. 9, a case where a divided scene B is connected to a divided scene A will be described as an example.

As illustrated in FIG. 9, the determination unit 23c determines similarities between the neighboring frames of the connection frame Ke in the divided scene A and the neighboring frames of the connection frame Ks in the divided scene B by round robin.

The information processing device 10 according to the embodiment then generates free-viewpoint content in which the divided scene A and the divided scene B are connected at frames determined to have the highest similarity as a result of the round robin determination of similarities.

In other words, the information processing device 10 according to the embodiment generates free-viewpoint content in which the divided scene A and the divided scene B are connected at frames in which the movements of a performer are most smoothly connected.

That is, the information processing device 10 according to the embodiment decides the connection order of the divided scenes based on the connection scores Scc and the music scores Scm, and then decides frames used for connecting the movements of a performer most smoothly when the divided scenes are connected in the connection order. As a result, the discrepancy of the movements of a performer between the divided frames can be reduced. In other words, the movements of a performer can be smoothly connected.

Note that, in the example illustrated in FIG. 9, a case where the connection frame Ke is the end frame of the divided scene and the connection frame Ks is the start frame of the divided frame is illustrated, but the present invention is not limited to this. That is, the connection frame Ke may be the neighboring frame of the end frame, and the connection frame Ks may be the neighboring frame of the start frame. Note that, the number of neighboring frames may be appropriately set based, for example, on the frame rate and the like. Furthermore, frames used as the connection frames may be appropriately changed according to the divided scenes to be connected.

Returning to the description of FIG. 2, the generation unit 23f will be described. The generation unit 23f generates free-viewpoint content by connecting divided frames according to the connection order decided by the decision unit 23e, and transmits the free-viewpoint content to the user terminal 50.

At this time, the generation unit 23f connects the divided scenes by connecting frames having the highest similarity among the neighboring frames based on the determination result of the determination unit 23c. At this time, the generation unit 23f generates free-viewpoint content in which divided frames are connected in rest sections of the music. Furthermore, the generation unit 23f may add a shadow to a performer of the free-viewpoint content or replace the background image.

Figure 10:
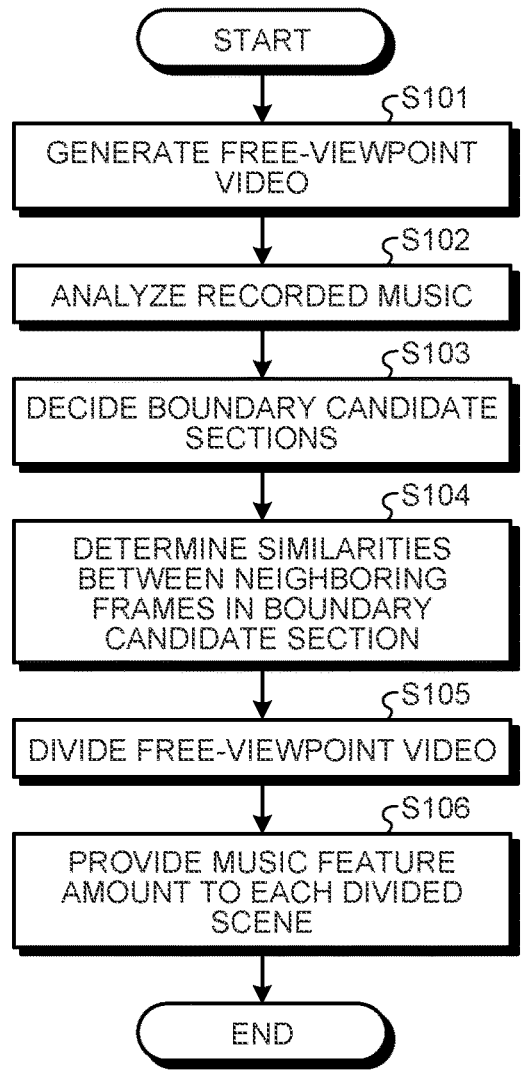
FIG. 10 is a flowchart illustrating a processing procedure performed by a scene information generation device according to the embodiment.

A processing procedure performed by the scene information generation device 1 according to the embodiment will now be described with reference to FIG. 10. FIG. 10 is a flowchart illustrating the processing procedure performed by the scene information generation device 1 according to the embodiment. The processing procedure described below is repeatedly performed by the control unit 13 of the scene information generation device 1 every time a multi-viewpoint video obtained by imaging a performer is acquired.

As illustrated in FIG. 10, the scene information generation device 1 firstly generates a free-viewpoint video based on a multi-viewpoint video (step S101), and analyzes the recorded music in the multi-viewpoint video (step S102).

Subsequently, the scene information generation device 1 decides boundary candidate sections in the free-viewpoint video based on the analysis result of the recorded music (step S103). Note that, the boundary candidate sections correspond to the rest section T illustrated in FIG. 3.

Subsequently, the scene information generation device 1 determines similarities between the neighboring frames in the boundary candidate section (step S104), and divides the free-viewpoint video based on the result of the similarity determination in step S104 (step S105).

The scene information generation device 1 then provides a music feature amount to each divided scene (step S106), and ends the processing.

Figure 11:
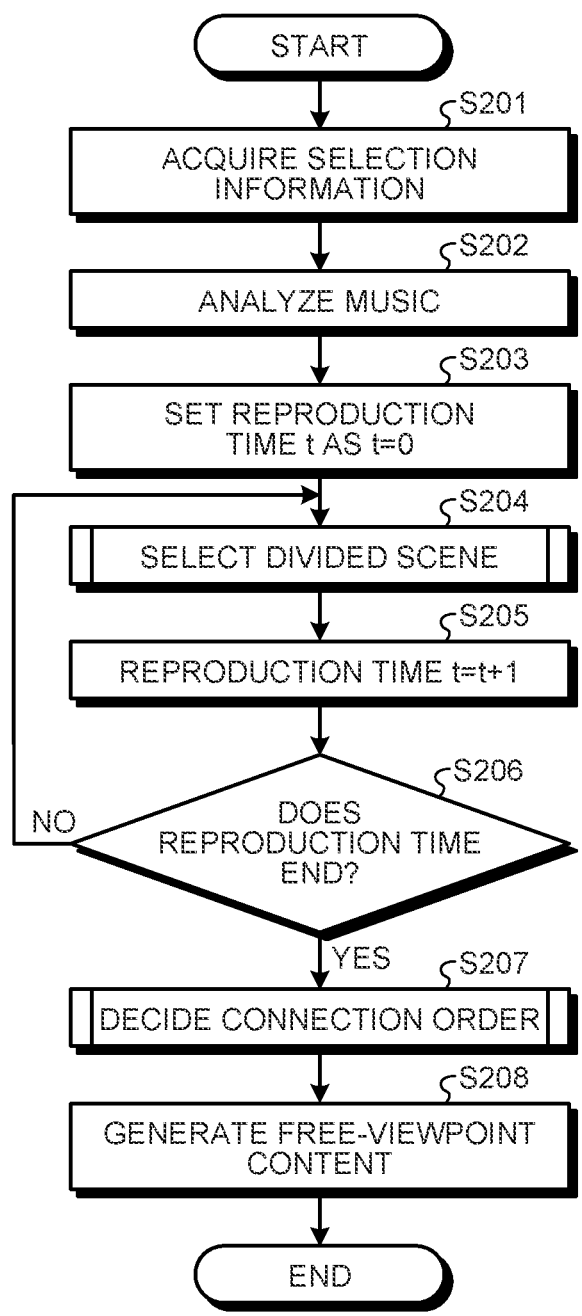
FIG. 11 is a flowchart illustrating a processing procedure performed by an information processing device according to the embodiment.

A processing procedure performed by the information processing device 10 according to the embodiment will now be described with reference to FIG. 11. FIG. 11 is a flowchart illustrating the processing procedure performed by the information processing device 10 according to the embodiment. Note that, the processing procedure described below is repeatedly performed by the control unit 23 of the information processing device 10 every time music selection information is acquired.

As illustrated in FIG. 11, when the information processing device 10 acquires music selection information (step S201), the information processing device 10 analyzes the music indicated by the music selection information (step S202). Subsequently, the information processing device 10 sets the music reproduction time t as t=0 (step S203).

Subsequently, the information processing device 10 selects a divided scene for each candidate path (step S204), and adds 1 to the reproduction time t (step S205). Subsequently, the information processing device 10 determines whether the reproduction time t+1 reaches the end of the reproduction time (step S206), and if it reaches the end of the reproduction time (step S206, Yes), the information processing device 10 proceeds to the processing of deciding connection order (step S207).

The information processing device 10 then generates free-viewpoint content in which the divided scenes are connected according to the connection order decided in step S207 (step S208), and ends the processing. If the reproduction time t+1 does not reach the end of the reproduction time in the determination processing of step S206 (steps S206, No), the information processing device 10 proceeds to the processing of step S204.

Figure 12:
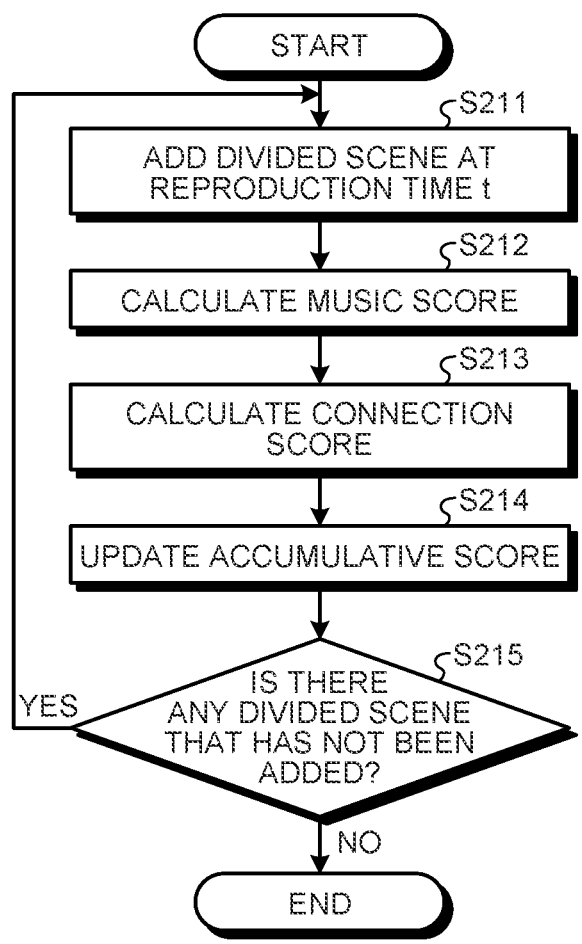
FIG. 12 is a flowchart (No. 1) illustrating a processing procedure of step S204 illustrated in FIG. 11.
Figure 13:
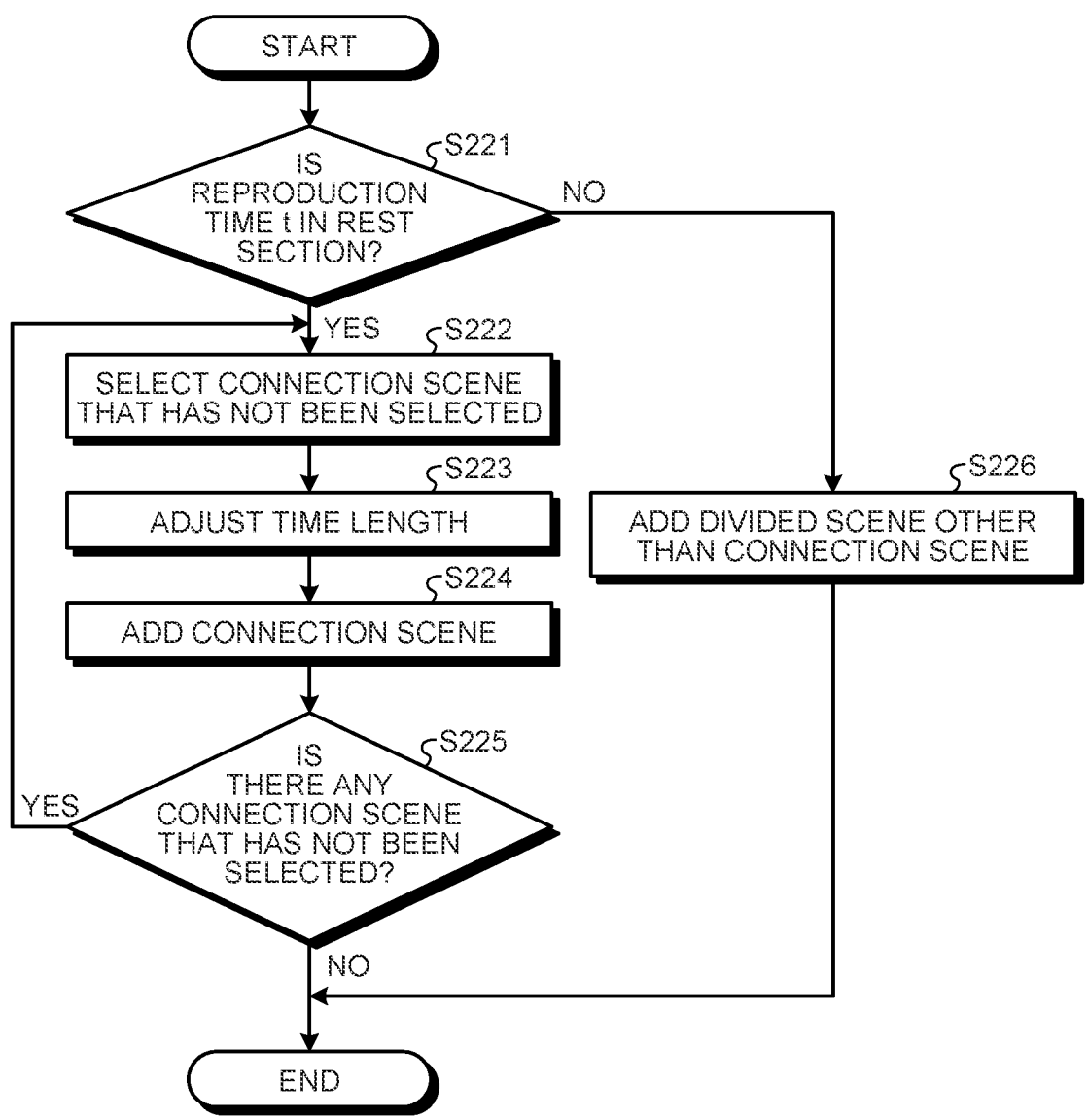
FIG. 13 is a flowchart (No. 2) illustrating the processing procedure of step S204 illustrated in FIG. 11.

Subsequently, the details of the processing procedure of step S204 illustrated in FIG. 11 will be described with reference to FIG. 12 and FIG. 13. FIG. 12 and FIG. 13 are flowcharts illustrating the processing procedure of step S204 illustrated in FIG. 11.

As illustrated in FIG. 12, when the information processing device 10 adds a divided scene at the reproduction time t (step S211), the information processing device 10 calculates a music score Scm based on the music feature amount of the added divided scene (step S212). The information processing device 10 then calculates a connection score Scc based on the added divided scene (step S213), and updates the accumulative score of the corresponding candidate path (step S214).

If there is any divided scene that has not been added to the candidate path (step S215, Yes), the information processing device 10 then proceeds to step S211, and if all the divided scenes have been added to each candidate path (step S215, No), the information processing device 10 ends the processing.

FIG. 13 is a flowchart of the processing of step S204 in the case where rest sections are taken into consideration. As illustrated in FIG. 13, the information processing device 10 determines whether the reproduction time t is in a rest section (step S221), and if the information processing device 10 determines that the reproduction time t is in a rest section (step S221, Yes), the information processing device 10 selects, for the reproduction time t, a connection scene Fc that has not been selected (step S222).

Subsequently, the information processing device 10 adjusts the time length of the connection scene Fc selected based on the rest section in step S222 (step S223), and adds the connection scene Fc to the candidate path (step S224).

After that, the information processing device 10 determines whether there is any connection scene Fc that has not been selected (step S225), and if there is any connection scene Fc that has not been selected (step S225, Yes), the information processing device 10 proceeds to the processing of step S222.

If the selection of all the connection scenes has been completed in the determination in step S225 (steps S225, No), the information processing device 10 ends the processing. If the reproduction time t is not in a rest section in the determination of step S221 (step S221, No), the information processing device 10 adds a divided scene other than the connection scene Fc to the candidate path (step S226), and ends the processing. Note that, although not illustrated here, it is assumed that the processing from step S212 to step S214 illustrated in FIG. 12 is performed following the processing of step S224.

Figure 14:
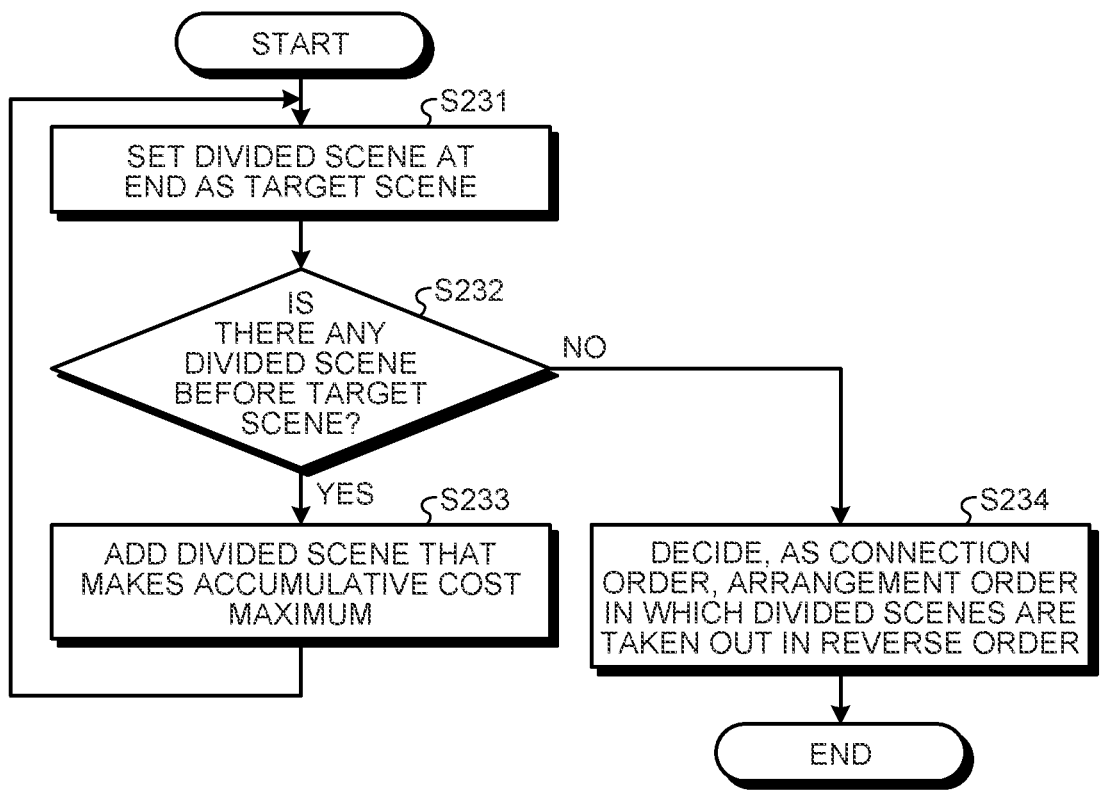
FIG. 14 is a flowchart illustrating a processing procedure of step S207 illustrated in FIG. 11.

The processing procedure of the processing of step S207 illustrated in FIG. 11 will now be described with reference to FIG. 14. FIG. 14 is a flowchart illustrating the processing procedure of step S207 illustrated in FIG. 11.

As illustrated in FIG. 14, when the information processing device 10 adds the divided scene at the end to a target scene (step S231), the information processing device 10 determines whether there is any divided scene before the target scene (step S232), and if there is any divided scene before the target scene (step S232, Yes), the information processing device 10 adds a divided scene that makes the accumulative cost maximum (step S233), and proceeds to step S231.

If there is no divided scene before the target scene in the determination processing of step S232 (steps S232, No), in other words, when whole of the processing of step S233 has been completed, the information processing device 10 decides, as the connection order, arrangement order in which the divided scenes are taken out in reverse order (step S234), and ends the processing.

Second Embodiment

Figure 15:
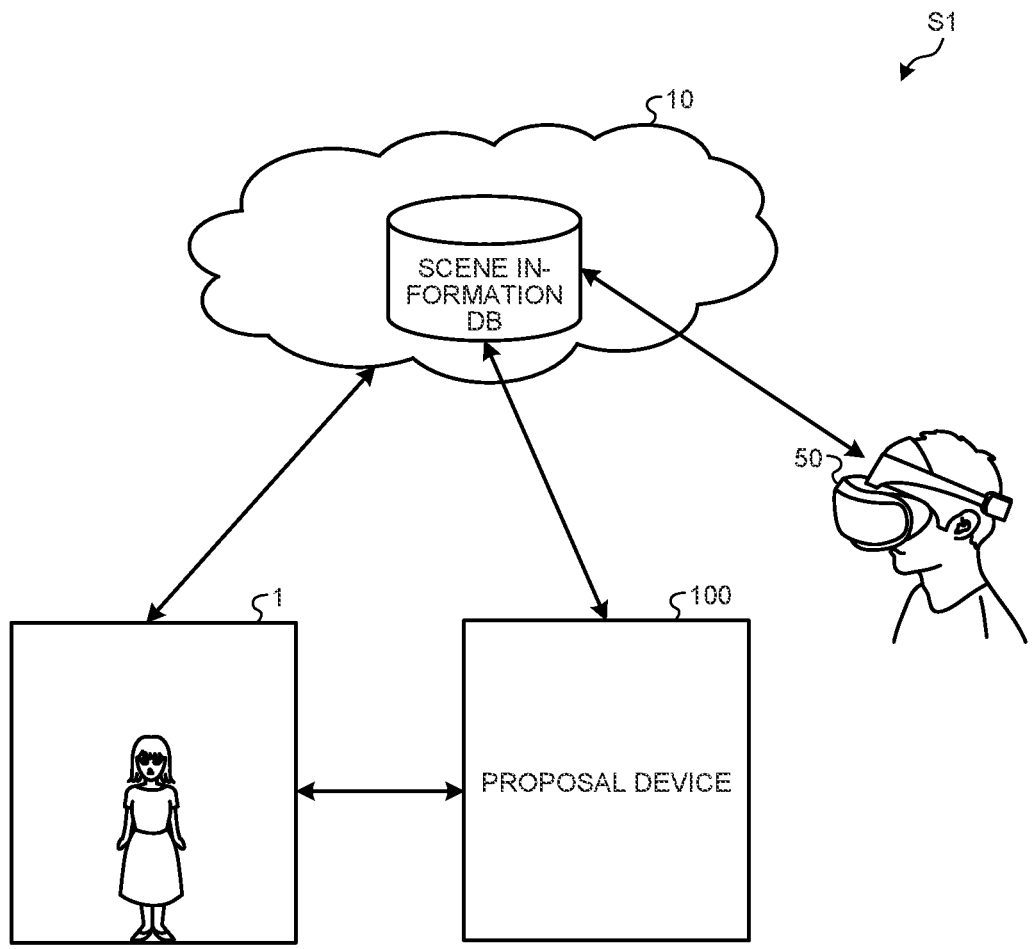
FIG. 15 is a diagram illustrating a configuration example of a providing system according to a second embodiment.

A providing system according to a second embodiment will now be described with reference to FIG. 15. FIG. 15 is a diagram illustrating a configuration example of the providing system according to the second embodiment. In the above-described embodiment, a case where the divided scenes are connected to generate free-viewpoint content such that the movements of a performer are smoothly connected has been described.

However, for example, when there are not enough divided scenes, there are few variations of free-viewpoint content, and thus there is a possibility that attractive content cannot be provided. On the other hand, even if the number of divided scenes is increased, the divided scene cannot be utilized for free-viewpoint content in a case where it cannot be connected to other divided scenes.

Therefore, as illustrated in FIG. 15, the providing system S1 according to the second embodiment further includes a proposal device 100 that proposes poses of a performer to the performer when a multi-viewpoint video is imaged.

Specifically, the proposal device 100 is a device that proposes a start pose and an end pose to a performer. When a performer dances with making the start pose and the end pose proposed by the proposal device 100 at the time of additional imaging, the versatility of each divided scene can be improved.

That is, the proposal device 100 proposes capturing a new divided scene used for complementing an existing (already captured) divided scene. Accordingly, free-viewpoint content in which divided scenes are connected can be generated.

Figure 16:
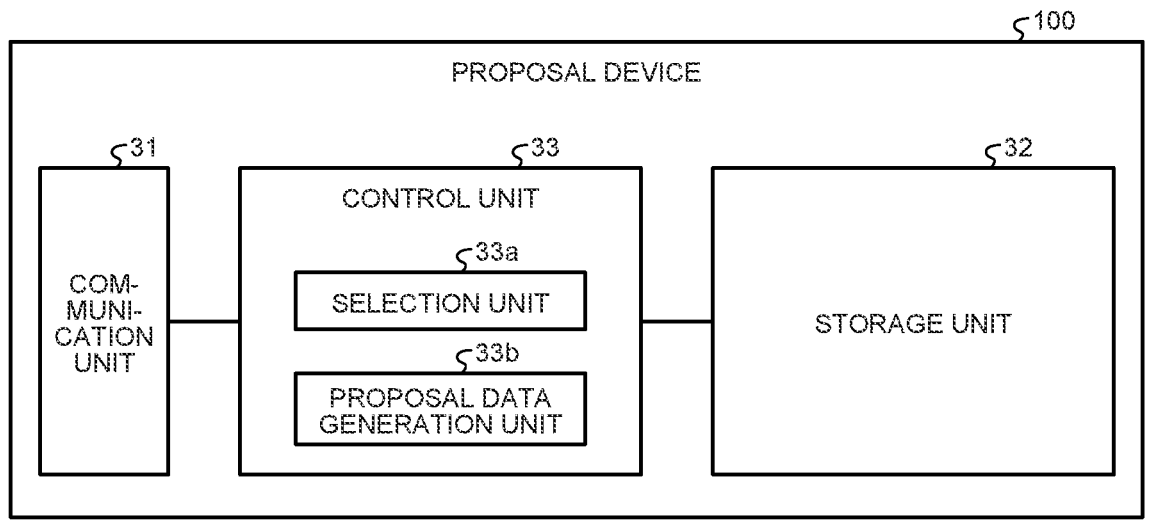
FIG. 16 is a block diagram illustrating a configuration example of a proposal device according to the embodiment.

A configuration example of the proposal device 100 will now be described with reference to FIG. 16. FIG. 16 is a diagram illustrating the configuration example of the proposal device 100 according to the embodiment. As illustrated in FIG. 16, the proposal device 100 includes a communication unit 31, a storage unit 32, and a control unit 33.

The communication unit 31 is a communication module used for communication with the scene information generation device 1 and the information processing device 10 via a predetermined network.

The storage unit 32 includes, for example, a semiconductor memory element such as a RAM and a flash memory, or a storage device such as a hard disk or an optical disk. The storage unit 32 stores information that the control unit 33 requires for various processing. Similarly to the information processing device 10, the storage unit 32 includes the scene information DB.

The control unit 33 is implemented, for example, when a central processing unit (CPU), a micro processing unit (MPU), and the like execute, on a working area such as a random access memory (RAM), a program stored in the proposal device 100. The control unit 33 is a controller, and may be implemented, for example, by an integrated circuit such as an application specific integrated circuit (ASIC) and a field programmable gate array (FPGA).

As illustrated in FIG. 16, the control unit 33 includes a selection unit 33a and a proposal data generation unit 33b, and implements or performs functions and actions of information processing to be described below. Note that, the internal configuration of the control unit 33 is not limited to the configuration illustrated in FIG. 16, and may be a different configuration as long as it is a configuration formed for performing the information processing to be described below. Also note that, the control unit 33 may be connected to a predetermined network by wire or wirelessly using, for example, a network interface card (NIC) or the like, and receive various types of information from an external server and the like via the network.

The selection unit 33a selects a start pose and an end pose of a divided scene to be newly captured referring to the scene information DB. For example, the selection unit 33a selects any divided scene from the scene information DB, and determines whether there are a predetermined number or more of divided scenes that can be connected after the selected divided scene.

When there are a predetermined number or more of divided scenes that can be connected after the selected divided scene, the selection unit 33a selects another divided scene. Here, a divided scene that can be connected refers to a divided scene having the above-described connection score Scc with respect to the selected divided scene that is equal to or higher than a threshold value.

Furthermore, if the number of divided scenes that can be connected is less than the predetermined number, the selection unit 33a selects the pose of a performer in the end frame of the selected divided scene as the start pose.

Subsequently, the selection unit 33a selects a divided scene having a connection score Scc with respect to the selected divided scene that is equal to or less than the threshold value. At this time, the selection unit 33a may select all of divided scenes having connection scores Scc that are equal to or less than the threshold value, or may select some of the divided scenes out of the divided scenes having connection scores Scc that are equal to or less than the threshold value.

In this case, the selection unit 33a may, for example, preferentially select divided scenes that can be connected to many divided scenes over other divided scenes. That is, the proposal device 100 can expand the variations of free-viewpoint content while reducing the load of additional capturing by proposing capturing a divided scene that is highly versatile and can be connected to divided scenes.

In this manner, the selection unit 33a selects a start pose and an end pose in order to complement a divided scene that has not been a candidate for connection to a divided scene to which few divided scenes can be connected after the divided scene. Accordingly, each piece of divided data can be utilized when free-viewpoint content is generated.

Note that, the selection unit 33a may, for example, select two divided scenes in which three-dimensional models of a performer in the connection frames have a similarity larger than a predetermined value referring to the scene information DB, and determine a start pose and an end pose. Furthermore, the selection unit 33a may select a start pose and an end pose based on a divided scene selected by a user.

The proposal data generation unit 33b generates proposal data related to poses at the time of additional capturing of a multi-viewpoint video. The proposal data generation unit 33b generates information about three-dimensional models of a start pose and an end pose as proposal data.

At this time, the proposal data generation unit 33b may specify recorded music at the time of additional imaging and the time length from the start pose to the end pose. Furthermore, the proposal data generation unit 33b may propose a series of choreography pieces from the start pose to the end pose.

If a plurality of start poses and a plurality of end poses are selected by the selection unit 33a, the proposal data generation unit 33b may display a list of the plurality of start poses and the plurality of end poses.

The proposal data generated by the proposal data generation unit 33b is displayed, for example, on a monitor set in the studio. Accordingly, a performer can watch the start pose and the end pose.

Figure 17:
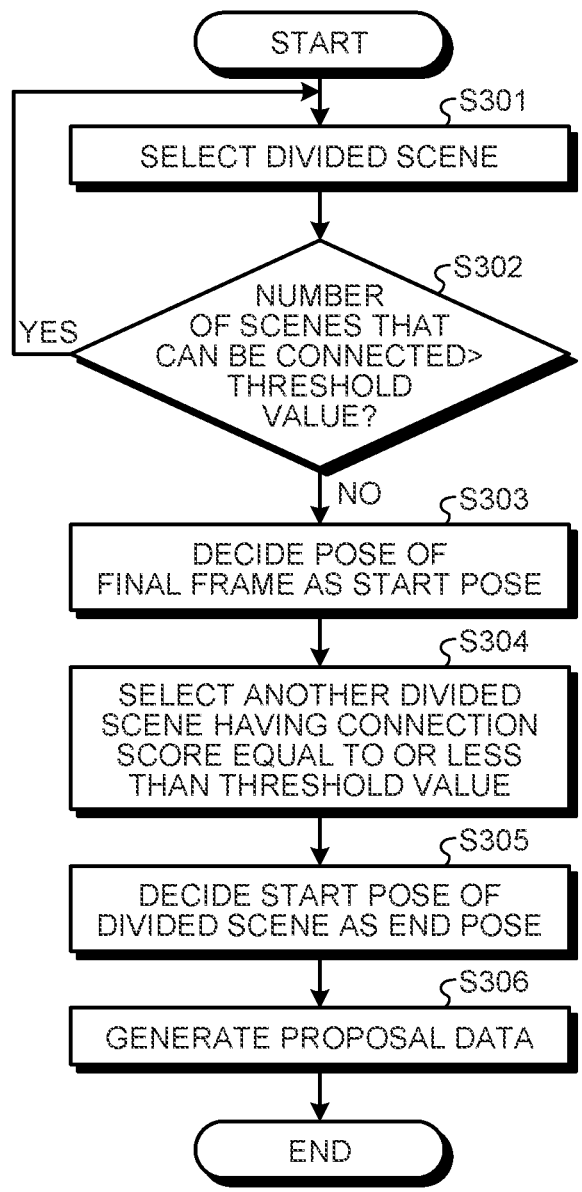
FIG. 17 is a flowchart illustrating a processing procedure performed by the proposal device according to the embodiment.

A processing procedure performed by the proposal device 100 according to the embodiment will now be described with reference to FIG. 17. FIG. 17 is a flowchart illustrating the processing procedure performed by the proposal device 100 according to the embodiment.

As illustrated in FIG. 17, the proposal device 100 according to the embodiment firstly selects a divided scene from the scene information DB (step S301), and determines whether the number of scenes that can be connected to the selected divided scene is larger than the threshold value (step S302).

If the number of scenes that can be connected is larger than the threshold value (step S302, Yes), the proposal device 100 proceeds to the processing of step S301 and selects another divided scene. If the number of scenes that can be connected is less than the threshold value in the determination process of step S302 (step S302, No), the proposal device 100 decides the pose of the final frame in the divided scene selected in step S301 as a start pose (step S303).

Subsequently, the proposal device 100 selects another divided scene having a connection score Scc with respect to the divided scene selected in step S301 that is equal to or less than the threshold value (step S304), and decides the pose of the start frame selected in step S304 as an end pose (step S305).

The proposal device 100 then generates proposal data based on the start pose decided in step S303 and the end pose decided in step S305 (step S306), and ends the processing.

Modification

In the above-described embodiments, a case where the information processing device 10 acquires music selection information from the user terminal 50 and generates free-viewpoint content based on the music selection information has been described. However, the present invention is not limited to this. That is, the information processing device 10 may acquire music selection information from a music server that manages music at a predetermined period and generate free-viewpoint content. That is, for example, when new music is released, free-viewpoint content may be automatically generated for the new music.

Furthermore, for example, the user terminal 50 may determine music playing on a smartphone or a speaker and transmit music selection information about the music to the information processing device 10. In this case, for example, free-viewpoint content can be reproduced in real time for the music currently playing.

Furthermore, for example, when free-viewpoint content is posted on SNS, the free-viewpoint content may partially be posted, and the rest of the free-viewpoint content (full content) may be provided when each user terminal 50 accesses the information processing device 10.

Furthermore, the information processing device 10 may acquire music selected by a user in karaoke as music selection information and generate free-viewpoint content. In this case, for example, a user can watch the free-viewpoint content conforming to his/her singing. That is, an application in which a performer dances to his/her singing can be provided.

Furthermore, in the above-described embodiments, a case where free-viewpoint content of a dance image conforming to music has been described, but the present invention is not limited to this. That is, free-viewpoint content of a dance image may be generated based on lighting effect represented by projection mapping.

Furthermore, a free-viewpoint video is not limited to a dance image, and other free-viewpoint video may appropriately be incorporated into free-viewpoint content as long as it is a three-dimensional image. In the above-described embodiments, the scene information generation device 1, the information processing device 10, and the proposal device 100 have been described as different devices. However, the present invention is not limited to this, and the functions may appropriately be integrated or distributed.

In the above-described embodiments, a case where an object is a performer and a sound is music has been described, but the present invention is not limited to this. Specifically, for example, animals, robots, machines, and the like may be used in content, and various sounds other than music may be used as a sound.

That is, free-viewpoint content is not limited to a dance image of a performer, and may be a combination of various objects and sounds.

Figure 18:
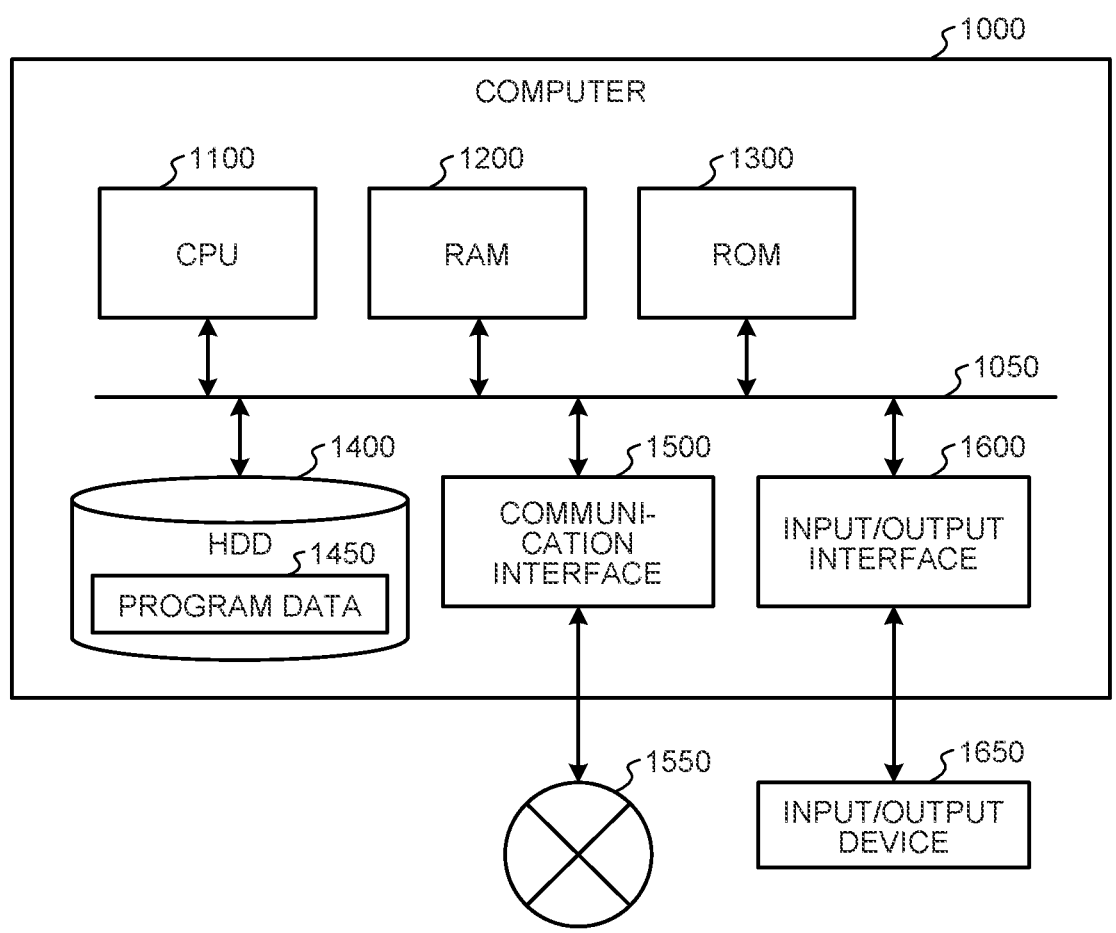
FIG. 18 is a hardware configuration diagram illustrating an example of a computer that implements functions of the information processing device.

The information device such as the information processing device according to each of the above-described embodiments is implemented, for example, by a computer 1000 having a configuration illustrated in FIG. 18. The information processing device 10 according to the embodiment will be hereinafter described as an example. FIG. 18 is a hardware configuration diagram illustrating an example of the computer 1000 that implements the functions of the information processing device 10. The computer 1000 includes a CPU 1100, a RAM 1200, a read only memory (ROM) 1300, a hard disk drive (HDD) 1400, a communication interface 1500, and an input/output interface 1600. The parts of the computer 1000 are connected by a bus 1050.

The CPU 1100 operates based on a program stored in the ROM 1300 or the HDD 1400 to control each part. For example, the CPU 1100 loads the program stored in the ROM 1300 or the HDD 1400 into the RAM 1200 and executes processing corresponding to various programs.

The ROM 1300 stores a boot program such as a basic input output system (BIOS) performed by the CPU 1100 when the computer 1000 is booted, a program that depends on the hardware of the computer 1000, and the like.

The HDD 1400 is a computer-readable recording medium that non-temporarily records a program performed by the CPU 1100, data used by the program, and the like. Specifically, the HDD 1400 is a recording medium that records a program according to the present disclosure that is an example of program data 1450.

The communication interface 1500 is an interface used for connecting the computer 1000 to an external network 1550 (for example, the Internet). For example, the CPU 1100 receives data from another device and transmits data generated by the CPU 1100 to another device via the communication interface 1500.

The input/output interface 1600 is an interface used for connecting the input/output device 1650 to the computer 1000. For example, the CPU 1100 receives data from an input device such as a keyboard or a mouse via the input/output interface 1600. Furthermore, the CPU 1100 transmits data to an output device such as a display, a speaker, and a printer via the input/output interface 1600. Furthermore, the input/output interface 1600 may function as a media interface used for reading a program and the like recorded on a predetermined recording medium (media). The media is, for example, an optical recording medium such as a digital versatile disc (DVD) and a phase change rewritable disk (PD), a magneto-optical recording medium such as a magneto-optical disk (MO), a tape medium, a magnetic recording medium, a semiconductor memory, and the like.

For example, when the computer 1000 functions as the information processing device 10 according to the embodiment, the CPU 1100 of the computer 1000 implements the functions of the acquisition unit 23a and the like by performing a program loaded on the RAM 1200. The HDD 1400 stores a program according to the present disclosure and data in the storage unit 22. Note that, the CPU 1100 reads the program data 1450 from the HDD 1400 and executes it, but as another example, these programs may be acquired from another device via the external network 1550.

Note that, the present technology can also have following configurations.

(1)
An information processing device comprising:
a decision unit configured to decide connection order of divided scenes obtained by dividing a free-viewpoint video based on a multi-viewpoint video obtained by imaging an object, based on a feature amount of a given sound and similarities between respective connection frames in the divided scenes; and
a generation unit configured to generate free-viewpoint content in which the divided scenes are connected in the connection order decided by the decision unit.

(2)
The information processing device according to the above-described (1),
wherein the free-viewpoint video
is a dance image in which the object is a performer and the performer dances to recorded music.

(3)
The information processing device according to any one of the above-described (1) to (2),
wherein the sound
is music.

(4)
The information processing device according to any one of the above-described (1) to (3), further comprising
a determination unit configured to determine the similarities between the connection frames based on three-dimensional models of the object in the respective connection frames.

(5)
The information processing device according to (4),
wherein the determination unit
determines the similarities based on bone models each indicating a joint position of the performer.

(6)
The information processing device according to any one of the above-described (4) to (5),
wherein the determination unit
determines the similarities based on point cloud data corresponding to surface shapes of the performer.

(7) The information processing device according to any one of the above-described (1) to (6),
in which the decision unit
decides the connection order based on an accumulative value of connection scores according to the similarities between the divided scenes, the accumulative value being for each of connection paths formed by connecting the divided scenes from a start to an end of the music.

(8) The information processing device according to any one of the above-described (1) to (7),
in which the determination unit
determines the similarities between the neighboring frames of the connection frames in addition to the connection frames when the connection order is decided by the decision unit, and
the generation unit
connects the divided scenes by connecting frames having a highest similarity among the neighboring frames.

(9)
The information processing device according to any one of the above-described (1) to (8),
wherein the generation unit
connects the divided scenes in a rest section of the sound.

(10)
The information processing device according to any one of the above-described (1) to (9)
further comprising
a calculation unit configured to calculate a music score indicating conformity between the music and the recorded music based on a feature amount of the music and feature amounts of recorded music in the divided scenes,
wherein the decision unit
decides the connection order based on the music score.

(11)
The information processing device according to (10),
wherein the calculation unit
calculates the music score based on tune of each part obtained by dividing the music and tune of each of the divided scenes.

(12)
The information processing device according to any one of the above-described (10) to (11),
wherein the calculation unit
calculates the music score based on a time length of each part obtained by dividing the music and a time length of each of the divided scenes.

(13)
The information processing device according to any one of the above-described (1) to (12),
wherein the decision unit
assigns at least one of the divided scenes having a time length adjusted according to a time length of a rest section to the rest section of the music.

(14)
The information processing device according to (13),
wherein the decision unit
adjusts the time length of the divided scene by thinning out a frame in the divided scene.

(15)
A proposal device comprising
a proposal data generation unit configured to generate proposal data related to a pose at a time of additional imaging of a free-viewpoint video based on similarities between respective connection frames in divided scenes obtained by dividing the free-viewpoint video based on a multi-viewpoint video obtained by imaging an object.

(16)

The proposal device according to (15), wherein the proposal data generation unit generates the proposal data in which an end pose of a performer who is the object in the accumulated divided scenes is a start pose, and a start pose of the performer in another one of the divided scenes is an end pose.

(17)

An information processing method performed by a computer, comprising:

deciding connection order of divided scenes obtained by dividing a free-viewpoint video based on a multi-viewpoint video obtained by imaging an object, based on a feature amount of a given sound and similarities between respective connection frames in the divided scenes; and generating free-viewpoint content in which the divided scenes are connected in the decided connection order.

(18)

A proposal method performed by a computer, comprising generating proposal data related to a pose at a time of additional imaging of a free-viewpoint video based on similarities between respective connection frames in divided scenes obtained by dividing the free-viewpoint video obtained by imaging an object.

(19)

A proposal method performed by a computer, including generating proposal data related to a pose at a time of additional imaging of a multi-viewpoint video obtained by imaging an object, based on a feature amount of given sound and similarities between respective connection frames in divided scenes obtained by dividing a live-action free-viewpoint video based on the multi-viewpoint video.

REFERENCE SIGNS LIST

1 SCENE INFORMATION GENERATION DEVICE
10 INFORMATION PROCESSING DEVICE
13a 3D MODEL GENERATION UNIT
13b MUSIC ANALYSIS UNIT
13c SCENE INFORMATION GENERATION UNIT
23a ACQUISITION UNIT
23b MUSIC ANALYSIS UNIT
23c DETERMINATION UNIT
23d CALCULATION UNIT
23e DECISION UNIT
23f GENERATION UNIT
33a SELECTION UNIT
33b PROPOSAL DATA GENERATION UNIT
50 USER TERMINAL
100 PROPOSAL DEVICE
S, S1 PROVIDING SYSTEM

The invention claimed is:

1. An information processing device comprising:
a decision unit configured to decide connection order of divided scenes obtained by dividing a free-viewpoint video based on a multi-viewpoint video obtained by imaging an object, based on a feature amount of a given sound and similarities between respective connection frames in the divided scenes; and
a generation unit configured to generate free-viewpoint content in which the divided scenes are connected in the connection order decided by the decision unit.

2. The information processing device according to claim 1,
wherein the free-viewpoint video
is a dance image in which the object is a performer and the performer dances to recorded music.

3. The information processing device according to claim 2,
wherein the sound
is music.

4. The information processing device according to claim 2 further comprising
a determination unit configured to determine the similarities between the connection frames based on three-dimensional models of the object in the respective connection frames.

5. The information processing device according to claim 4,
wherein the determination unit
determines the similarities based on bone models each indicating a joint position of the performer.

6. The information processing device according to claim 4,
wherein the determination unit
determines the similarities based on point cloud data corresponding to surface shapes of the performer.

7. The information processing device according to claim 4,
wherein the decision unit
sets a plurality of connection paths formed by connecting the divided scenes from a start to an end of the sound, and decides the connection order based on an accumulative value of connection scores according to the similarities between the divided scenes, the accumulative value being calculated for each of the connection paths.

8. The information processing device according to claim 4,
wherein the determination unit
determines, for connections between the divided scenes, the similarities between the neighboring frames of the connection frames in addition to the similarities between the connection frames when the connection order is decided by the decision unit, and
the generation unit
connects the divided scenes by connecting frames having a highest similarity among the neighboring frames.

9. The information processing device according to claim 1,
wherein the generation unit
connects the divided scenes in a rest section of the sound.

10. The information processing device according to claim 3
further comprising
a calculation unit configured to calculate a music score indicating conformity between the music and the recorded music based on a feature amount of the music and feature amounts of recorded music in the divided scenes,
wherein the decision unit
decides the connection order based on the music score.

11. The information processing device according to claim 10,
wherein the calculation unit calculates the music score based on tune of each part obtained by dividing the music and tune of each of the divided scenes.

12. The information processing device according to claim 10,
wherein the calculation unit
calculates the music score based on a time length of each part obtained by dividing the music and a time length of each of the divided scenes.

13. The information processing device according to claim 12,
wherein the decision unit
assigns at least one of the divided scenes having a time length adjusted according to a time length of a rest section to the rest section of the music.

14. The information processing device according to claim 13,
wherein the decision unit
adjusts the time length of the divided scene by thinning out a frame in the divided scene.

15. An information processing method performed by a computer, comprising:
deciding connection order of divided scenes obtained by dividing a free-viewpoint video based on a multi-viewpoint video obtained by imaging an object, based on a feature amount of a given sound and similarities between respective connection frames in the divided scenes; and
generating free-viewpoint content in which the divided scenes are connected in the decided connection order.

* * * * *